April 24, 1951      A. M. SALAZAR      2,549,854
BATTERY CHARGER
Filed July 20, 1949      2 Sheets-Sheet 1
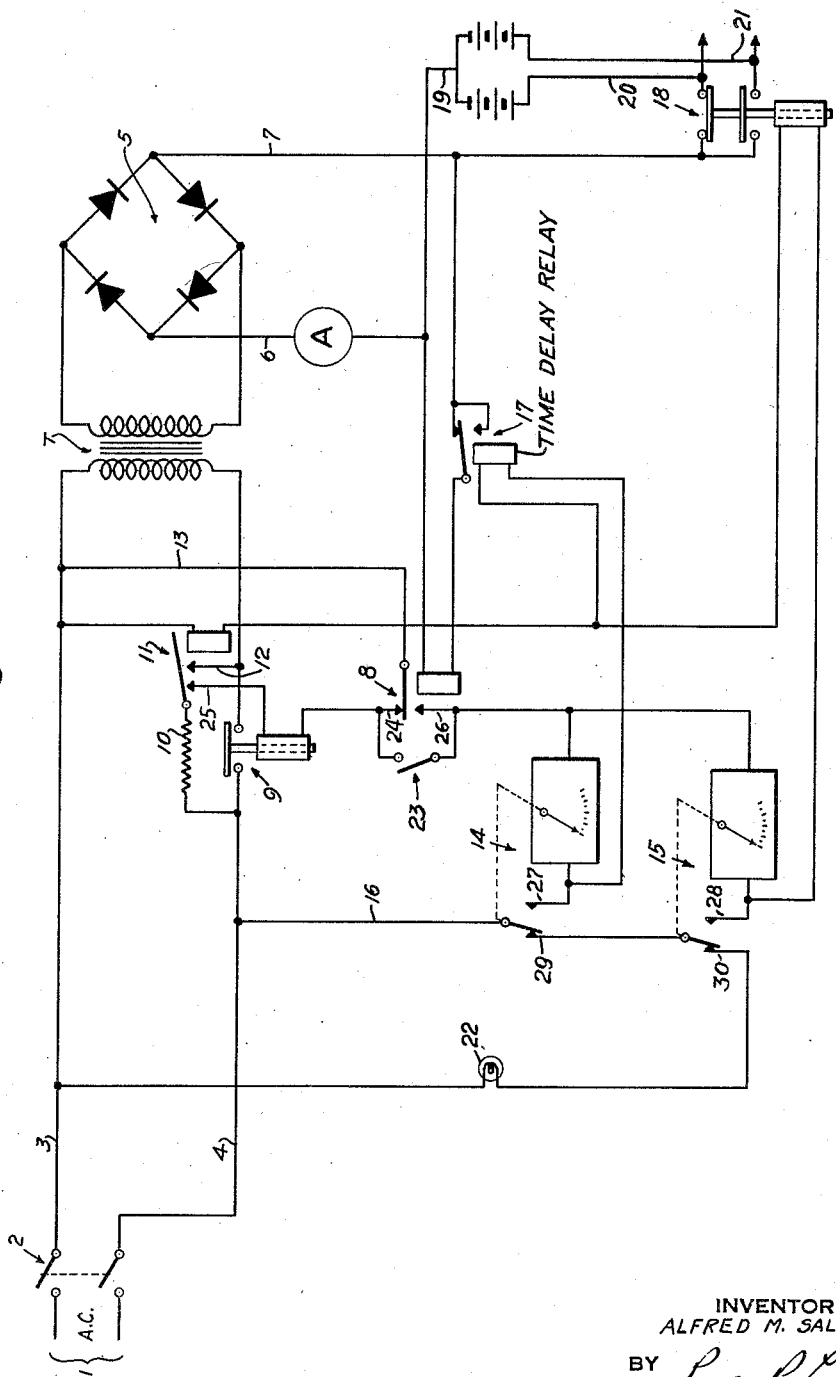
INVENTOR
ALFRED M. SALAZAR
BY Percy P. Lantry
ATTORNEY

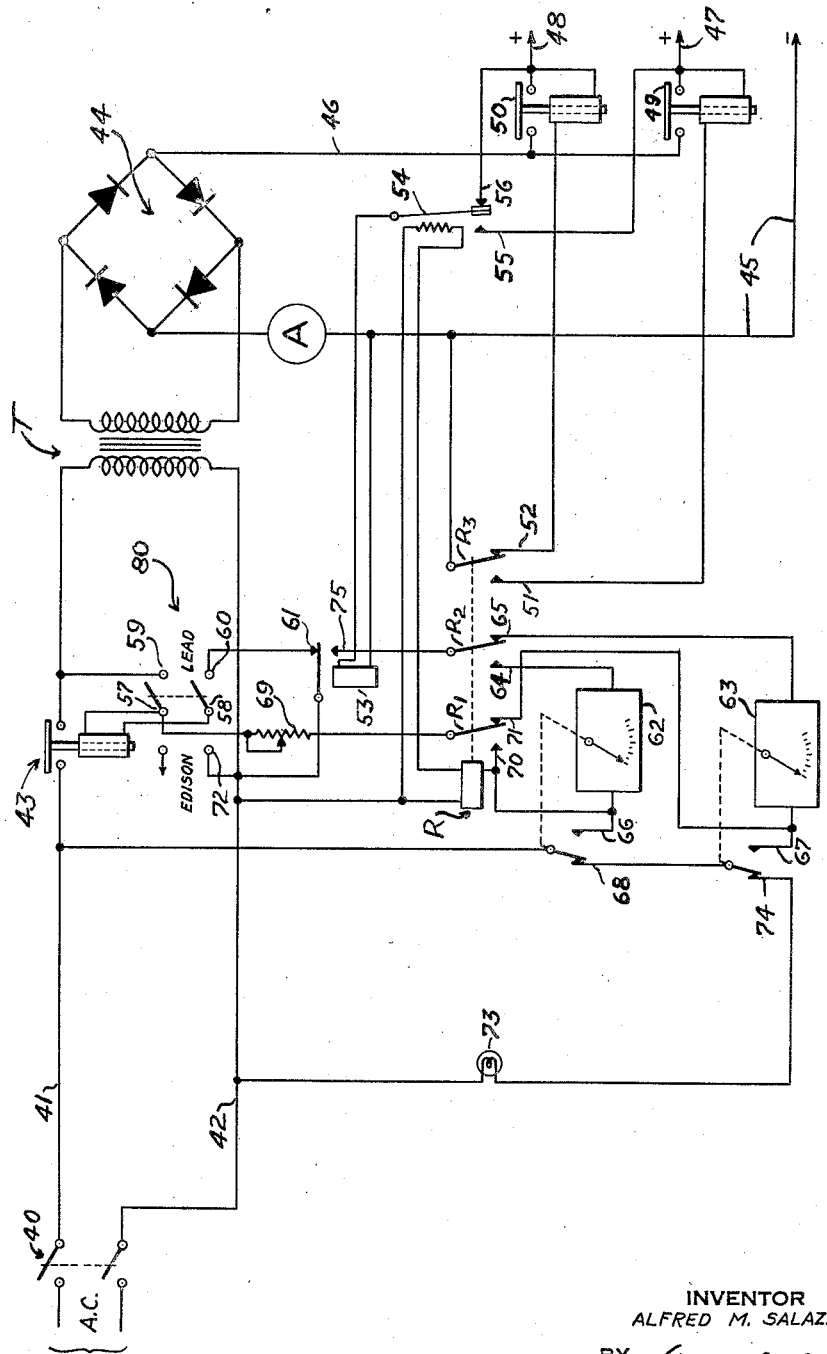

Patented Apr. 24, 1951

2,549,854

UNITED STATES PATENT OFFICE 2,549,854

BATTERY CHARGER

Alfred M. Salazar, Babylon, N. Y., assignor to Federal Telephone and Radio Corporation, New York, N. Y., a corporation of Delaware Application July 20, 1949, Serial No. 105,759

6 Claims. (Cl. 320—15)

This invention relates to battery chargers and more particularly to improvements in time and voltage controlled battery charging systems.

The value of a charging current that can be supplied to a lead cell battery at any given time during the charge is dependent upon the state of charge of the battery. If current in excess of this value is forced into the battery, it overheats and gassing occurs. The creation of gassing, besides representing a loss in energy, also means that a scrubbing action is produced, a process which slowly removes the active material from the cell plates resulting in reduced battery life.

Keeping the voltage applied across the battery constant provides the quickest method of charging to obtain maximum efficiency and minimum gassing. The principal disadvantage of this method is that it requires an initial charging current of 500 amperes for a 500 ampere-hour battery. As this current is extremely high, it requires large, expensive charging equipment.

As most industrial material handling equipment is operated on the basis of an eight hour shift operation, the time available for recharging of the batteries varies from eight to sixteen hours, and time can therefore be sacrificed to some extent in favor of lower cost. In general, the longer the available charging time, the lower the initial charging current required and the lower the cost of the equipment to supply it. Accordingly, users of this equipment require charging units capable of charging one or two batteries within the allotted time without manual operation of the controls by an operator.

Battery chargers have been previously developed capable of charging a lead storage battery at a relatively high rate until the predetermined voltage is reached and then automatically reducing the charging rate to the finishing value which is maintained for a definite and predetermined time. In my application Ser. No. 683,314 filed July 13, 1946 now Patent No. 2,531,472, issued November 28, 1950, I disclosed a two rate battery charger utilizing a single high current rated contactor with a low rated contactor capable of charging either lead or Edison batteries.

It is an object of my present invention to provide a charger using a single alternating current supply circuit and rectifier means to automatically charge in sequence a plurality of batteries at high and low rates of charge.

Another object of my invention is to provide a charger utilizing a single high current rated contactor which, when initially set into operation, will sequentially charge two lead batteries with both high and low rates of charging and alternatively will sequentially charge two Edison batteries at high rates of charge for predetermined rates of time.

It has been found that the voltage at which excessive gassing occurs in lead storage batteries is approximately 2.37 volts per cell at 77° F. It is obvious that the higher the rate of charge, the sooner the battery reaches this gassing voltage. It has been found that the most satisfactory results are obtained when a battery is charged up to the gassing point (approximately 85% of full charge), at the high rate and then charged at the low rate for about three hours to bring the battery up to rated capacity plus overcharge. The low charging rate, as determined by battery manufacturers, is that rate which, even if continued after the battery is fully recharged, will not be detrimental to the battery.

According to one of the features of my invention a voltage sensitive relay is used to introduce a resistance into the battery charging circuit when the battery potential reaches the gassing point, thereby lowering the rate of charge. A timing device regulates the duration of the low rate of charge. At the expiration of the charging period a recycling control, comprising another timing device, is used to automatically substitute a second battery in place of the first one and to repeat the cycle of high and low rates of charge for the second battery.

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 is a schematic view of the charging means connected with a single phase alternating source of supply.

Fig. 2 is a schematic view of a modification of the battery charger circuit of Fig. 1.

Referring to Fig. 1 there is shown therein a source of alternating current 1 connected to the primary of transformer T through the double-pole-single-throw switch 2 and the main alternating current supply lines 3 and 4. The secondary of transformer T is connected to the rectifier bridge 5 which is connected in turn through the output lines 6 and 7 to the batteries to be charged.

A high-rate contactor 9 is provided which, in its normally open position, opens circuit line 4, This open circuit is bridged by a low rate resistor 10, one end of which is connected to line 4 on the power side of the contactor 9, and the other end of which is connected through the armature of a circuit-making relay 11 and a contact 12 of this relay which is in turn connected to line 4 on the transformer side of the contactor 9. The normally open relay 11 has two contacts, 12 and 25, and is closed whenever the charging circuit is operative, as will be subsequently shown.

Voltage sensitive relay 8 is connected across the output of rectifier bridge 5 to control the duration of the high rate of charge. This relay switches the circuit to a low rate of charge when the battery being charged reaches a predetermined voltage level. In its normally open position against its front contact 24 the armature of relay 8, which is connected through line 13 to supply line 3, provides a closed circuit for the actuating coil of the high rate contactor 9 through line 4, the low rate resistor 10, the armature of relay 11 and the contact 25 of relay 11 which is connected to the front contact 24 of relay 8 through the actuating coil of contactor 9. High rate contactor 9 is thereby closed, shunting the low rate resistor 10 and placing the primary of the transformer T directly across the alternating current source 1. Contactor 9 is maintained in this closed position by the potential drop across the primary of transformer T through contact 12 and the armature of relay 11, contact 25 of relay 11, the actuating coil of the high rate contactor, the armature and front contact 24 of relay 8, and line 13 which is connected to supply line 3.

The low rate of charge is initiated by the closing of voltage sensitive relay 8 which opens the circuit 2 of the actuating coil of contactor 9, thus eliminating the shunt across the low rate resistor 10 in the primary circuit of transformer T.

Two electric timing relays, 14 and 15, are provided to control the duration of the low rate of charge. These relays may have electric motors associated with timing devices which, when set to any predetermined time interval, will close upon expiration of such interval the associated relay armature against its back contact. After the motor has been operated for the predetermined interval of time, the armature will be released against its front contact.

When the voltage sensitive relay 8 is actuated and its armature is pulled against its front contact 26 the two electric timers are connected in common through line 13 to line 3 of the main alternating current supply circuit. The other side of electric timer 14, when preset, is connected through its back contact 27 and its armature through line 16 to line 4 of the alternating current supply circuit. The other side of electric timer 15, when preset, is connected through its back contact 28 and its armature, the front contact 29 and armature of timing relay 14, and line 16 to line 4 of the alternating current supply circuit. It may be seen that the motor of timing relay 15 cannot operate until timing relay 14 is open and its armature is against its front contact 29. The back contact 27 of timing relay 14 is connected through the actuating coil of a time delay relay 17 and through the actuating coil of circuit-making relay 11 to line 3.

Time delay relay 17 may be a copper slug or ratchet relay with a slow travelling time; or it may be a thermal time delay having a heating element in place of the actuating coil as shown in Fig. 2. This relay has an armature and two contacts, both of which connect the voltage sensitive relay 8 to the output of the rectifier bridge. While the armature of relay 17 is travelling from one contact to the other the voltage sensitive relay 8 is connected from the output circuit of the rectifier bridge for a brief interval of time in order to allow the armature of relay 8 to return to its normally open position while the output circuit is being shifted from a first to a second battery.

The break-before-make battery contactor 18 connects positive output line 7 to a first battery through lead 20 while in its normally open position, and to a second battery through lead 21 when actuated. The negative poles of both batteries are connected in common to negative output line 6 through lead 19. The coil of contactor 18 is connected to the back contact 28 of timing relay 15 through the coil of the circuit-making relay 11 to line 3. It is thus apparent that if either or both of the timing relays are preset, either the time delay relay 17 or the battery contactor 18 will be actuated through the coil of the circuit-making relay 11. Conversely if neither timing relay is preset the coil of relay 11 will not be actuated and the main alternating current supply source will be disconnected from the transformer.

Single-pole single-throw switch 23 is provided to connect the front and back contacts of the voltage sensitive relay 8 in order to convert the circuit for charging Edison batteries, which require only the high rate of charge for a predetermined time interval.

In the arrangement shown in Fig. 1 the positive poles of the two lead batteries to be charged are connected to leads 20 and 21 respectively and the negative poles are connected to the common negative lead 19. Electric timing relays 14 and 15 are set to the desired time intervals of the low rate charge of the batteries connected to leads 20 and 21 respectively. The setting of the electric timers will close the armatures of the timing relays 14 and 15 against their respective back contacts 27 and 28. Closure of the main power switch 2 places the potential difference between lines 3 and 4 across the actuating coil of circuit-making relay 11 through the actuating coil of relay 17, the armature and back contact 27 of relay 14 and line 16. The armature of relay 11 will close against its contacts 12 and 25, actuating the coil of the high-rate contactor 9 through line 4, the low rate resistor 10, the armature and contact 25 of relay 11, the coil of contactor 9, the back contact 24 and the armature of voltage sensitive relay 8, line 13, and line 3. The closing of the high rate contactor 9 shunts the low-rate resistor and places the potential drop of the main power supply circuit across the primary of transformer T. This potential drop maintains contactor 9 in a closed position through contact 12 and the armature of relay 11, the coil of contactor 9, the back contact 24 and the armature of relay 8, and line 13. The circuit will maintain a high-rate condition of charge until the last mentioned circuit is opened by the actuation of voltage sensitive relay 8.

The voltage sensitive relay 8 will close when the battery being charged across the leads 19 and 20 reaches a predetermined potential limit. The closing of relay 8 against its back contact 26 opens the high-rate contactor 9, placing the low-rate resistor 10, which is no longer shunted, in the main power supply circuit. At the same time the motor of timing relay 14 is set into operation through line 16, its back contact 27, the front contact 26 and armature of relay 8, and line 13. It is obvious that the motor of timing relay 15 cannot operate while the armature of timing relay 14 is against its back contact 27. The circuit will now charge the first battery at a low rate until the expiration of the timing interval preset on the timing relay 14.

When the armature of the timing relay 14 is released against its front contact 29, the coil of battery contactor 18 is actuated through line 16 the armature and front contact 29 of timing relay 14, the armature and back contact 28 of timing relay 15, and the coil of circuit-making relay 11. The closing of battery contactor 18 will disconnect the first battery from the output circuit and will, in its place, connect the second battery between leads 21 and 19. At the same time the time delay relay 17 will be opened while its armature travels from one of its contacts to the other, for an interval of time sufficient to disconnect the voltage sensitive relay 8 from the output circuit of the rectifier. This allows relay 8 to return to the normally opened position against its back contact 24, thereby closing the high-rate contactor 9 and opening the circuit of the timing relay motors to prevent their operation. The circuit will charge the second battery at the high rate until it reaches the voltage level requisite to close the armature relay 8 against its front contact, opening the high-rate contactor and again placing the low-rate resistor in the main power supply circuit. The closure of relay 8 will also set the motor of timing relay 15 into operation through its own back contact 28, the front contact 29 of timing relay 14, and line 16. The low rate of charge will continue until the timing relay 15 opens after the preset period of time. The opening of this relay disconnects both timing relays from the power supply circuit and also inactivates the coil of relay 11, causing the main power supply to open. A pilot light 22 may be connected between the front contact 30 of timing relay 15 and line 3 to indicate the completion of the battery charge.

It is apparent that this circuit may be used to charge a single battery with its positive pole connected to either lead 20 or 21 provided the corresponding electric timer is preset. It is equally apparent that the circuit cannot be put into operation without the presetting of either or both of the electric timers 14 and 15.

In order to charge Edison batteries, which require a single high rate of charge for a predetermined rate of time, single-pole-throw switch 23 is closed connecting the front and back contacts of relay 8. This switch keeps the high-rate contactor 9 closed regardless of the position of voltage sensitive relay 8. With the two batteries connected and the two timing relays preset, timing relay 14 will be placed across the power supply circuit, the time delay relay 17 will be in an activated condition and the circuit-making relay 11 will be closed. At the expiration of the preset time the armature of timing relay 14 will open against its front contact 29 placing timing relay 15 across the power supply circuit and connecting the second battery to the output by closing battery contactor 18 through the back contact 28 of timing relay 15 and the coil of the circuit-making relay 11. Relay 17 will be de-energized. When timing relay 15 opens, the timing relay motors, the battery contactor 18, the time delay relay 17, and the circuit-making relay coil 11 will all be inactivated, disconnecting the transformer from the main power source.

At the expiration of the charging period the battery connected to lead 20 may show a slight discharge through the rectifier bridge 5 and through the coil of the voltage sensitive relay. The energy loss through these circuits, however, is almost negligible.

Fig. 2 illustrates a similar battery charging circuit modified in the use of component parts and in circuit connections. In this circuit the alternating current in-put is applied to the primary of a transformer T through a double-pole-single-throw switch 40 and the main alternating current supply lines 41 and 42. Line 41 is normally open circuited by the high-rate contactor 43. A transfer relay R having three armatures $R_1$, $R_2$ and $R_3$, each with its own front and back contacts, is provided in this circuit to effectuate the shift of the charging circuit from a first to a secondary battery.

The secondary of the transformer T is connected to a rectifier bridge 44, the out-put of which is supplied to the batteries to be charged through the negative lead 45 and the positive line 46 which is connected to the positive leads 47 and 48 through the normally open battery contactors 49 and 50 respectively.

The actuating coil of battery contactor 49 has two ends connected respectively to the battery lead 47 and to the front contact 51 of the transfer relay armature $R_3$. The actuating coil of contactor 50 has its two ends connected respectively to the battery lead 48 and the back contact 52 of the transfer relay armature $R_3$. Armature $R_3$ of the transfer relay is connected to the negative output lead 45, and consequently the coil of contactor 49 will be energized across the battery connected to leads 45 and 47 through the front contact 51 and armature $R_3$ when the transfer relay is actuated, thus placing the battery connected to leads 47 and 45 across the output of the rectifier bridge 44. The coil of contactor 50 will be placed across the battery connected to leads 45 and 48 through the front contact 52 and the armature $R_3$ of the transfer relay when the relay is in its normally open position. It is apparent that when armature $R_3$ is against its back contact 52 the battery connected between leads 48 and 45 will be charged from the rectifier bridge 44 and the battery connected between leads 47 and 45 will be disconnected therefrom, inasmuch as contactor 49 cannot be actuated.

The shift from high to low rates of charge is controlled by the voltage sensitive relay 53, the actuating coil of which has one end connected to the negative lead 45 and the other end connected to the bi-metallic armature of time delay thermostat 54. The front contact 55 of the time delay thermostat is connected to the battery lead 47 and the back contact 56 is connected to the battery lead 48. When the time delay thermostat is energized the voltage sensitive relay 53 will be connected across the battery between leads 47 and 45. When the time delay thermostat opens the bi-metallic armature will take an appreciable amount of time to travel to the back contact 56, thereby disconnecting the actuating coil of the voltage sensitive relay for a sufficient interval of time for the armature of the voltage sensitive relay 53 to regain its normally open position. The time delay thermostat armature then connects the voltage sensitive relay through the back contact 56 across the battery connected between leads 48 and 45.

A double-pole-double-throw selector switch 80 adapts the circuit for charging either Lead or Edison batteries. The two ends of the actuating coil of the high rate contactor 43 are connected to center posts 57 and 58 of the selector switch. When the selector switch is thrown to the Lead side, post 57 is connected with post 59 which in turn is connected to the main supply line 41 on the transformer side of contactor 43, and post 58 is connected to post 60 of the selector switch which in turn is connected to the back contact 61 of the voltage sensitive relay 53. The armature of the voltage sensitive relay 53 is connected to the main supply line 42 while the front contact 75 of this relay is connected to the armature $R_2$ of the transfer relay R.

Two electrical timers 62 and 63, each having an associated relay, are utilized to control the duration of the low rate of charge of the batteries connected to leads 47 and 48 respectively. One side of electric timer 62 is therefore connected to the front contact 64 of the armature $R_2$ and one side of the electrical timer 63 is connected to the back contact 65 of armature $R_2$. The other side of electrical timer 62 is attached to its own back contact 66 and the other side of electrical timer 63 is connected to its own back contact 67. The armature of electrical timing relay 63 is connected to the front contact 68 of electrical timing relay 62; the armature of electrical timing relay 62 is in turn connected to the main supply line 41. It will thus be seen that electrical timer 63 cannot be operated unless the armature of electrical timing relay 62 is opened and against its front contact 68.

The transfer relay R and the time delay thermostat 54 are connected in parallel between the main supply line 42 and the back contact 66 of the electrical timer 62, and will therefore be actuated whenever electrical timer 62 is pre-set and its associated armature is against its back contact 66.

The low rate resistor 69 is connected between the center post 57 of the selector switch 80 and armature $R_1$ of the transfer relay. The front contact 70 of this armature is connected to the back contact 66 of electrical timing relay 62; the back contact 71 of this armature is connected to the back contact 67 of electrical timing relay 63.

When the selector switch 80 is thrown to the Edison side, center post 58 is connected to main supply line 42 through post 72.

A pilot lamp 73 may be connected between the back contact 74 of the electrical timing relay 63 and line 42 to indicate the expiration of the charging period.

To operate the charging circuit the positive poles of two lead cell batteries to be charged are connected to leads 47 and 48 respectively and their negative poles are connected in common to the negative lead 45. The selector switch 80 is thrown to the Lead position and the two electrical timers 62 and 63 are pre-set to the desired duration of low rate of charge for the batteries connected to leads 47 and 48 respectively.

The pre-setting of electrical timers 62 and 63 will switch their associated armatures against their back contacts 66 and 67 respectively. When the main power switch 40 is closed the transfer relay R is energized and its armatures $R_1$, $R_2$ and $R_3$ are closed against their front contacts 70, 64 and 51 respectively. The time delay thermostat 54 will also become energized and its bi-metallic armature will close against its front contact 55. The high-rate contactor 43 will immediately close, its coil being actuated by the current from the supply line 42, the armature and back contact 61 of the voltage sensitive relay 53, posts 60 and 58 of the selector switch 80, the high rate contactor coil, post 57 of the selector switch, low rate resistor 69, the armature $R_1$ and the front contact 70 of transfer relay R, the back contact 66 and the armature of electrical timing relay 62 which is connected to the supply line 41. Closure of the high rate contactor will shunt the circuit of the low rate resistor 69 and the contactor will be maintained in its closed position by the potential developed across the primary of transformer T. Inasmuch as armature $R_3$ is against its front contact 51, the battery connected to lead 47 will close the battery contactor 49 and the battery will be charged at the high rate.

The high rate of charge will continue until the battery potential reaches the predetermined limit and actuates the voltage sensitive relay 53 through the front contact 55 of the time delay thermostat 54. The closing of this relay opens high rate contactor 43 and the main supply current will then flow through posts 59 and 57 of the selector switch 80, the low rate resistor 69, the armature $R_1$ and the front contact 70 of the transfer relay, and the back contact 66 and the armature of the electrical timing relay 62, thus introducing the low rate resistor into the main supply circuit and reducing the current flow.

At the same time, the closure of the voltage sensitive relay 53 against it front contact 75 will cause the motor of the electrical timer 62 to operate through its associated back contact 66 and the front contact 64 and armature $R_2$ of the transfer relay R. The low rate of charge of the battery connected to lead 47 will continue for the interval of time pre-set on electrical timer 62.

At the expiration of this time interval the armature of electrical timing relay 62 will open against its front contact 68 thereby de-energizing the transfer relay R and the time delay thermostat 54.

The opening of the armature $R_3$ against its back contact 52 will open-circuit the contactor 49 and close the circuit of contactor 50 across the battery connected to lead 48, thereby substituting this battery for the battery connected to lead 47 in the out-put circuit of the rectifier. Inasmuch as the bi-metallic armature of the time delay thermostat 54 will take an appreciable amount of time to travel from its front contact 55 to its back contact 56, the voltage sensitive relay 53 will be temporarily disconnected and its armature will return to its normally open position against its back contact 61. The closing of this relay will close the circuit of the high rate contactor 43 and will reinstitute the high rate of charge for the second battery.

When this battery reaches its predetermined potential limit the voltage sensitive relay 53 will close, placing the charging circuit in its low rate condition and setting electrical timer 63 into operation through the armature and front contact 75 of voltage sensitive relay 53, armature R₂ and its back contact 65, the back contact 67 and armature of electrical timing relay 63, and the front contact 68 and armature of electrical timing relay 62. At the expiration of the interval of time preset on electrical timer 63, its armature will open against its front contact 74, lighting pilot lamp 73 to indicate that the charging circuit is no longer connected to the alternating current input.

When it is desired to charge Edison cells the batteries are connected as before and the selector switch 80 is thrown to the Edison position. The electrical timers 62 and 63 are preset to the desired duration of the high rate of charge to be applied to the batteries connected to leads 47 and 48 repectively. The circuit is now arranged so that a high rate contactor 43 will be closed whenever either one or both of the electrical timers 62 and 63 are in a pre-set closed condition regardless of the condition of the voltage sensitive relay 53. Inasmuch as Edison batteries are of high voltage, the voltage sensitive relay 53 will remain closed for the entire charging period, so that electrical timers 62 and 63 will operate in sequence along with the respective battery contactors 49 and 50. The batteries connected to leads 47 and 48 are therefore sequentially charged at the high rate for the intervals of time pre-set on the respective electrical timers 62 and 63. When the armatures of the two timers are against their front contacts 68 and 74 the charging circuit will be disconnected as before and the pilot lamp 73 will indicate that the batteries may be removed.

While I have shown several embodiments of the circuit, many variations will be obvious to those skilled in the art, as for example the adaptation of these circuits to three phase current or the addition of other batteries to be changed in sequence. It is to be clearly understood therefore that these descriptions are made only by way of example and not as limitations to the scope of my invention.

What is claimed is:

1. A battery charger comprising rectifying means adapted for connection to a source of alternating current, a direct current output circuit from said rectifying means, means to alternatively connect a plurality of batteries to said output circuit, means responsive to the battery potential to automatically switch the battery charger from an initial high rate of charge to a lower rate of charge, and means to sequentially actuate said connecting means after each cycle of high and low rate of charge.

2. A battery charger comprising rectifying means adapted for connection to a source of alternating current, a direct current output circuit from said rectifying means, means to sequentially connect each of two sets of battery cells to said output circuit, means responsive to a predetermined potential of a connected set of battery cells to lower the initial rate of charge of the battery charger, means to automatically actuate said sequential connecting means after a predetermined duration of the lower rate of charge thereby initiating the charging cycle for said second set of battery cells.

3. A high and low rate battery charger adapted to charge two storage batteries in sequence comprising rectifying means, an alternating current input circuit having a resistance, a direct current output circuit for said rectifying means, means to alternatively connect the said two storage batteries to said output circuit, a line contactor responsive to the potential of a connected storage battery to shunt said input circuit resistor when the battery potential is below a predetermined limit, timing means to control the time interval of charge after each connected storage battery reaches the said predetermined potential limit, means responsive to the said timing means to actuate said connecting means at the expiration of said time interval of charge of the first of said two storage batteries, thereby connecting said second storage battery for a charging cycle.

4. A two-rate battery charger adapted to charge two storage batteries in sequence comprising rectifying means adapted for connection to an alternating current source, a direct current output circuit from said rectifying means, means to alternatively connect said two storage batteries to said output circuit, means responsive to a predetermined potential of a connected battery to reduce the initial high rate of charge, timing means to control the time interval of the reduced charging rate, means to actuate said connecting means at the expiration of said timed interval of reduced rate of charge of the first storage battery, and means to disconnect the batteries at the expiration of the timed interval of reduced rate of charge of the second storage battery.

5. A two-rate battery charger adapted to charge in sequence a first and a second storage battery comprising rectifying means adapted for connection to a source of alternating current, a direct current output circuit for said rectifying means, means to sequentially connect the first and the second storage battery to the said output circuit, voltage responsive means to reduce the rate of charge when the connected battery is above a predetermined level of potential, a first timing means to control the time interval of reduced rate of charge of said first battery, means responsive to the expiration of said time interval to actuate said connecting means to disconnect said first battery and connect said second battery to said output circuit, a second timing means to control the time interval of reduced rate of charge of the said second battery, means responsive to the expiration of the second time interval to disconnect said battery charger from said alternating current source.

6. A two rate battery charger adapted to charge in sequence a first and a second storage battery comprising rectifying means, an alternating current input circuit having a resistance, a direct current output circuit for said rectifying means, means to sequentially connect the said two storage batteries to said output circuit, a voltage sensitive relay responsive to a predetermined potential of a connected battery, a line contactor responsive to said voltage sensitive relay to shunt said input circuit resistor when said battery potential is below said predetermined potential, a first timing means to control the time interval of charge after the first storage battery reaches said predetermined potential, a first means responsive to the expiration of said time interval to actuate said connecting means to disconnect said first battery and connect said second battery to said output circuit, a second means responsive to the expiration of said time interval to de-energize said voltage sensitive relay for a time sufficient to return the relay to its low battery potential condition, a second timing means to control the time interval of charge after the second storage battery reaches said predetermined potential limit, means responsive to the expiration of the second time interval to open said alternating current input circuit.

ALFRED M. SALAZAR.

REFERENCES CITED

The following references are of record in the file of this patent:

UNITED STATES PATENTS

| Number | Name | Date |
|---|---|---|
| 836,314 | Freund | Nov. 20, 1906 |
| 1,283,380 | Watson | Oct. 29, 1918 |
| 1,344,812 | Ogden | June 29, 1920 |
| 1,430,107 | Ogden | Sept. 26, 1922 |
| 1,726,639 | Addicks | Sept. 3, 1929 |
| 1,970,329 | Marrison | Aug. 14, 1934 |
| 2,096,440 | Wetzer | Oct. 19, 1937 |
| 2,104,603 | Agnew et al. | Jan. 4, 1938 |
| 2,165,040 | Exner | July 4, 1939 |
| 2,227,118 | Amsden | Dec. 31, 1940 |
| 2,409,911 | Strong | Oct. 22, 1946 |

FOREIGN PATENTS

| Number | Country | Date |
|---|---|---|
| 424,126 | Great Britain | Feb. 11, 1935 |